US008627122B2

(12) United States Patent
Lu

(10) Patent No.: US 8,627,122 B2
(45) Date of Patent: Jan. 7, 2014

(54) USB CHARGING CIRCUIT FOR A COMPUTER

(75) Inventor: Wen-Sheng Lu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 148 days.

(21) Appl. No.: 13/303,160

(22) Filed: Nov. 23, 2011

(65) Prior Publication Data

US 2012/0331312 A1 Dec. 27, 2012

(30) Foreign Application Priority Data

Jun. 27, 2011 (CN) .......................... 2011 1 0174795

(51) Int. Cl.
*G06F 1/00* (2006.01)
*G06F 11/30* (2006.01)

(52) U.S. Cl.
USPC ........................... 713/300; 713/310; 713/340

(58) Field of Classification Search
USPC ................................................. 713/300–340
See application file for complete search history.

(56) References Cited

U.S. PATENT DOCUMENTS

| 6,105,143 | A  | * | 8/2000  | Kim ............................. 713/324 |
| 7,017,055 | B1 | * | 3/2006  | Ho .............................. 713/300 |
| 8,166,317 | B2 | * | 4/2012  | Ito et al. ....................... 713/300 |
| 2002/0194514 | A1 | * | 12/2002 | Sanchez ........................ 713/300 |
| 2003/0200475 | A1 | * | 10/2003 | Komoto ........................ 713/400 |
| 2004/0015732 | A1 | * | 1/2004  | El-Kik et al. ................ 713/300 |
| 2004/0187042 | A1 | * | 9/2004  | Kawanabe ................... 713/300 |
| 2008/0272741 | A1 | * | 11/2008 | Kanamori ..................... 320/137 |
| 2010/0115150 | A1 | * | 5/2010  | Hachiya ......................... 710/19 |
| 2011/0083022 | A1 | * | 4/2011  | Lai ................................ 713/300 |
| 2011/0093727 | A1 | * | 4/2011  | Hwang ......................... 713/320 |
| 2012/0017101 | A1 | * | 1/2012  | So et al. ....................... 713/300 |
| 2012/0023341 | A1 | * | 1/2012  | Lin et al. ...................... 713/300 |

FOREIGN PATENT DOCUMENTS

| JP | 2000270281 | A | * | 9/2000  | .............. H04N 5/63 |
| JP | 2005196352 | A | * | 7/2005  | .............. G06F 13/38 |
| JP | 2005352864 | A | * | 12/2005 | .............. G06F 3/00 |
| JP | 2007233852 | A | * | 9/2007  | .............. G06F 13/38 |
| JP | 2009015752 | A | * | 1/2009  | .............. G06F 1/32 |
| JP | 2012033129 | A | * | 2/2012  | .............. G06F 1/16 |

OTHER PUBLICATIONS

Nagy, V.; Stopjakova, V.; Brenkus, J.; Simlastik, M.; Konfal, M., "CMOS Dual-Channel 0.5A Power Switch for Power Distribution Via USB Port," Mixed Design of Integrated Circuits and Systems, 2007. MIXDES '07. 14th International Conference on , pp. 559,563, Jun. 21-23, 2007.*

(Continued)

*Primary Examiner* — Faisal M Zaman
(74) *Attorney, Agent, or Firm* — Altis Law Group, Inc.

(57) ABSTRACT

A Universal Serial Bus (USB) charging circuit for a computer includes a USB interface, a USB power terminal, a standby power terminal, a switch unit, a IC chip, and a control unit. The control unit disconnects the USB interface from the standby power terminal when receiving a high voltage level from the system power terminal or a first control signal from the IC chip. The control unit connects the standby power terminal supply to the USB interface when receiving a second control signal from the IC chip and the first switch signal from the switch unit; the control unit disconnects the standby power terminal supply from the USB interface when receiving a second control signal from the IC chip and the second switch signal from the switch unit.

15 Claims, 2 Drawing Sheets

(56) References Cited

OTHER PUBLICATIONS

Tan Thiam Loong; bin Abu Hassan, A.H.; Chua Han Kung, "Power management for USB2.0 5V supply using load resistive and switch capacitive detection approach," Intelligent and Advanced Systems (ICIAS), 2012 4th International Conference on , vol. 1, pp. 461,466, Jun. 12-14, 2012.*

Lin Zhigui; Meng Dejun; Zhong Qingqing, "Design and Implementation of OTG Communication System Terminal Based on USB," Control, Automation and Systems Engineering (CASE), 2011 International Conference on , pp. 1,4, Jul. 30-31, 2011.*

Lynn, K., "Universal serial bus (USB) power management," Wescon/98 , pp. 194,201, Sep. 15-17, 1998.*

\* cited by examiner

USB CHARGING CIRCUIT FOR A COMPUTER

BACKGROUND

1. Technical Field

The present disclosure relates to a USB charging circuit, and particularly, to a USB charging circuit for a computer.

2. Description of Related Art

USB (Universal Serial Bus) is one of the most popular interfaces for personal computers, and can supply power to peripheral devices. However, turning on the computer to charge the peripheral devices is troublesome and wastes the power of the computer.

Therefore, what is needed is a USB charging circuit that charges the peripheral devices without turning on the computer.

BRIEF DESCRIPTION OF THE DRAWINGS

The components in the drawings are not necessarily drawn to scale, the emphasis instead being placed upon clearly illustrating the principles of a USB charging circuit for a computer. Moreover, in the drawings, like reference numerals designate corresponding parts throughout the several views.

DETAILED DESCRIPTION

Figure 1:
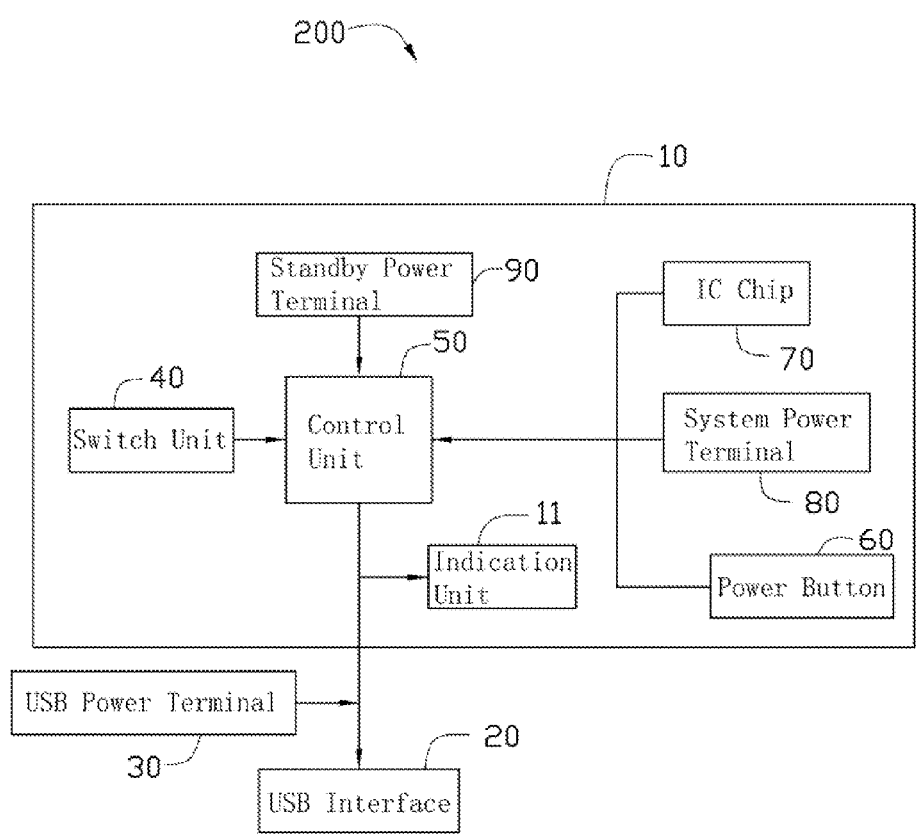
FIG. 1 is a block diagram of a USB charging circuit in accordance with an exemplary embodiment.

Referring to FIG. 1, a USB charging circuit 200 for a computer (not shown) includes a charging module 10, a USB power terminal 30, and a USB interface 20. The USB interface 20 can be connected to a peripheral device(s) (not shown), and the charging module 10 can charge the connected peripheral device when the USB power terminal 30 is not available.

The charging module 10 includes a switch unit 40, a control unit 50, a power button 60, an Integrated Circuit (IC) chip 70, a system power terminal 80, a standby power terminal 90, and an indication unit 11. In the present embodiment, the computer can go to different system power states (S0-S5) according the Advanced Configuration and Power Interface (ACPI) specification. In the system power state S0, the standby power terminal 90, the system power terminal 80 and the USB power terminal 30 are available; in the system power state S3, the standby power terminal 90 and the USB power terminal 30 are available; in the system power state S4 or S5, only the standby power terminal 90 is available. The IC chip 70 outputs no signal in the system power state S0, outputs a low voltage level to the control unit 50 in the system power state S3, and outputs a high voltage level to the control unit 50 in the system power state S4 or S5.

When the computer is in ON state (system power state S0), the USB power terminal 30 and the system power 80 are available, and the IC chip 70 outputs no signal to the control unit 50. The standby power terminal 90 is disconnected from the USB interface 20 when the system power 80 is available, and any peripheral device connected to the USB interface 20 is supplied with power by the USB power terminal 30.

When the computer is in sleep mode (system power state S3), the system power 80 is not available but the USB power terminal 30 is still available, and the IC chip 70 outputs a low voltage level to the control unit 50. The standby power terminal 90 is disconnected from the USB interface 20 when the control unit 50 is receiving a low voltage level, and any peripheral device connected with the USB interface 20 is supplied with power by the USB power terminal 30.

When the computer is in hibernation state (system power state S4) or in the OFF state (system power state S5), the USB power terminal 30 and the system power 80 are not available, and the IC chip 70 outputs a high voltage level to the control unit 50. The control unit 50 controls whether the standby power terminal 90 is connected with the USB interface 20 according to the switch unit 40. When the switch unit 40 is triggered to apply a first switch signal to the control unit 50, the standby power terminal 90 is connected to the USB interface 20 to supply outward power. When the switch unit 40 is triggered to apply a second switch signal, the standby power terminal 90 is disconnected from the USB interface 20, and the outward power to any peripheral device is discontinued.

When the power button 60 is depressed to bring the computer from the hibernating state or the OFF state to the ON state, the power button 60 generates a low voltage level signal to the control unit 50. The standby power terminal 90 is disconnected from the USB interface 20 when the low voltage level is received, and any connected peripheral device can be charged by the USB power terminal 30.

Figure 2:
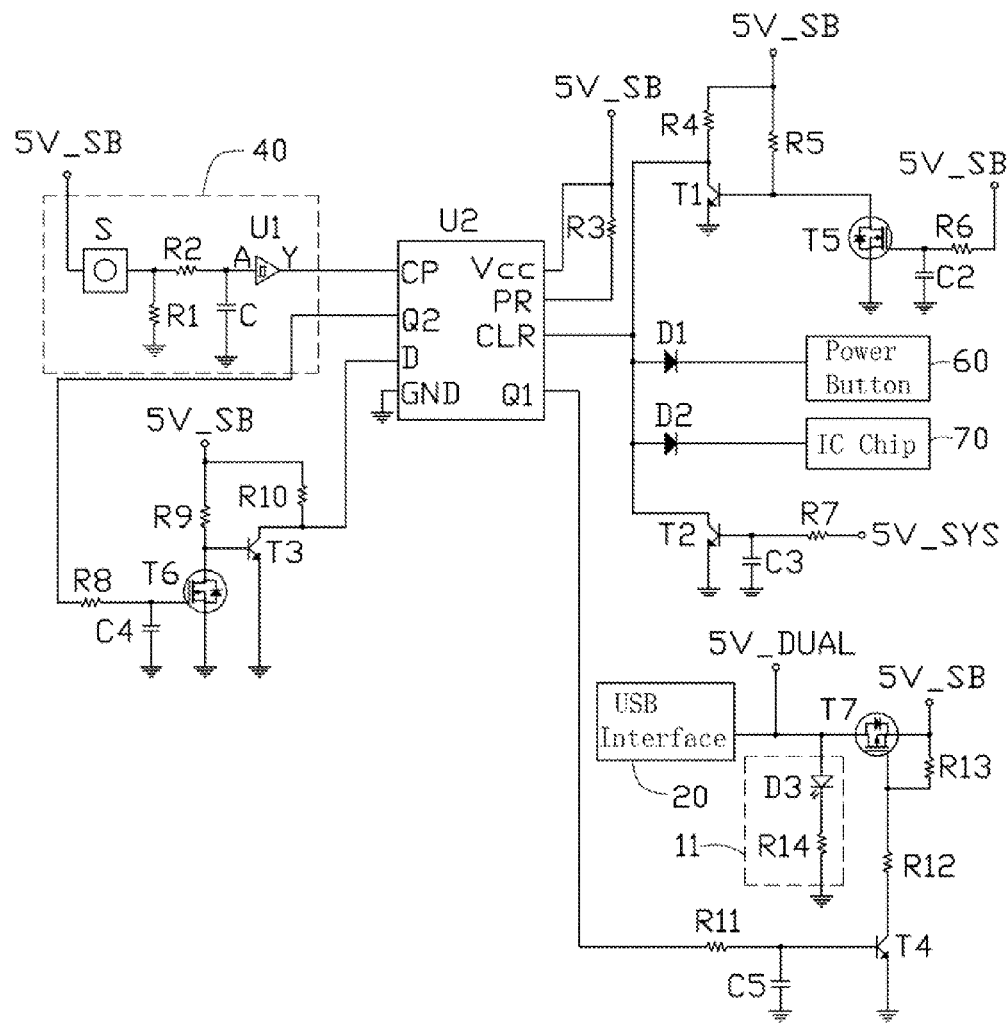
FIG. 2 is a circuit diagram of the USB charging circuit of FIG. 1.

Referring to FIG. 2, in one present embodiment, the control unit 50 includes a flip-flop chip (U2), switches T1-T7, diodes D1 and D2, resistors R3-R13, and capacitors C2-C5. The flip-flop chip U2 includes a power input (Vcc), a ground pin (GND), a preset input (PR), a clear input (CLR), a clock pulse input (CP), a data input (D), a first output Q1, and a second output Q2. In the present embodiment, the switches T1-T4 are bipolar junction transistors (BJT), and the other switches T5-T7 are metal oxide semiconductor field-effect transistors (MOSFET).

The switch unit 40 includes a switch button (S), a Schmitt trigger (U1) having a signal input (A) and a signal output (Y), a capacitor C1, and resistor R1 and R2. The signal input of the Schmitt trigger is connected to the standby power terminal 90 (5V_SB) sequentially through the resistor R2 and the switch button. The signal input of the Schmitt trigger is also connected to ground through the capacitor C, and is connected to ground sequentially through the resistors R2 and R1. The signal output of the Schmitt trigger is connected to the clock pulse input of the flip-flop chip U2.

The clear input of the flip-flop chip U2 is connected to the standby power terminal 90 through the resistor R4, and is further connected to ground through the switch T1. The base of the switch T1 is connected to the standby power terminal 90 through the resistor R5, and is further connected to ground through the switch T5. The gate of the switch T5 is connected to the standby power terminal 90 through the resistor R6, and is further connected to ground through the capacitor C2.

The clear input is further connected to the power button 60, to the IC chip 70, and to ground respectively through the diode D1, D2, and the switch T2. The base of the switch T2 is connected to the system power 80 through the resistor R7, and is connected to ground through the capacitor C3.

The data input of the flip-flop chip U2 is connected to the standby power terminal 90 through the resistor R10, and is further connected to ground through the switch T3. The base of the switch T3 is connected to the standby power terminal 90 through the resistor R9, and is further connected to ground through the switch T6. The gate of the switch T6 is connected to the second output Q2 through the resistor R8. The switch T6 is further connected to ground through the capacitor C4.

The USB interface 20 is connected to the USB power terminal 30 (5V_DUAL), and is connected to the standby power terminal 90 through the switch T7. The gate of the switch T7 is connected to the standby power terminal 90 through the resistor R13, and is further connected to ground sequentially through the resistor R12 and the switch T4. The base of the switch T4 is connected to the first output Q1 of the flip-flop chip U2 through the resistor R11, and is further connected to ground through the capacitor C5.

When the computer is connected to the household power supply, the standby power terminal 90 is available, the capacitor C2 is charged and the switch T5 is open because the gate voltage is lower than the threshold voltage of the switch T5. The switch T1 receives a high voltage level from the standby power terminal 90 when the switch T5 is open, and the switch T1 is closed. The clear input is connected to ground and receives a low voltage level when the switch T1 is closed, and clears the flip-flop chip U2 to an initial state.

When the computer is in the ON state, both of the system power 80 and the USB power terminal 30 are available, and the IC chip 70 outputs no signal to the clear input. The base of the switch T2 receives a high voltage level from the system power 80, and the switch T2 is closed. The clear input is connected to ground to receive a low voltage level when the switch T2 is closed, and the flip-flop chip U2 outputs a low voltage level to the gate of the switch T4 in regardless of the status of the clock pulse input, and the switch T4 is open. The gate of the switch T7 receives a high voltage level from the standby power terminal 90 when the switch T4 is open, and then the switch T7 is open. The USB interface is disconnected from the standby power terminal 90 when the switch T7 is open, and a power supply to any connected peripheral device is supplied by the USB power terminal 30.

When the computer is in sleep mode, the system power 80 is not available and the USB power terminal 30 is available, and the IC chip 70 outputs a low voltage level signal to the clear input. Power is supplied by the USB power terminal 30 to any connected peripheral device when the clear input receives the low voltage level as in the ON state.

When the computer is in the hibernation mode or the OFF state, both the system power 80 and the USB power terminal 30 are not available, and the IC chip 70 outputs a high voltage signal to the clear input. The operation of the flip-flop chip U2 is determined by the clock pulse input when the clear input receives the high voltage level signal. When a user depresses the switch button of the switch unit 40, a pulse signal is applied to the Schmitt trigger. The flip-flop chip U2 is triggered on the positive edge generated by the Schmitt trigger through the clock pulse input to output a high voltage level to the gate of the switch T6 through the output Q2. The switch T6 is closed when the gate of the switch T6 receives the high voltage level. The base of the switch T3 is connected to ground when the switch T6 is closed and receives a low voltage level, and the switch T3 becomes open. The data input of the flip-flop chip U2 receives a high voltage level from the standby power terminal 90 when the switch T3 is open, and a high level signal is output to the base of the switch T4 to close the switch T4. The gate of the switch T7 is connected to ground when the switch T4 is closed, and the switch T7 is closed. The USB interface 20 is connected to the standby power terminal 90 when the switch T7 is closed, and the peripheral device is able to receive power through the standby power terminal 90. When the peripheral device is fully charged or recharged, the switch button may be depressed again, and the flip-flop chip U2 is triggered to output a low level signal to the gate of the switch T6. The switch T6 is opened when the gate of the switch T6 receives a low voltage level. The base of the switch T3 is connected to the standby power terminal 90 when the switch T6 is open to receive a high voltage level, and the switch T3 is closed. The data input of the flip-flop chip U2 is connected to ground and receives a low voltage level when the switch T3 is closed, and the flip-flop chip U2 outputs a low level signal to the base of the switch T4 to open the switch T4. The gate of the switch T7 is connected to the standby power terminal 90 when the switch T4 is open, and the switch T7 is open. The USB interface 20 is thus disconnected from the standby power terminal 90 when the switch T7 is open. When the computer is in the hibernation mode or the OFF state and the peripheral device is receiving power through the standby power terminal 90, the user depressing the power button 60 to turn on the computer will generate a low voltage signal to the clear input of the flip-flop chip U2. The standby power terminal 90 is disconnected from the USB interface 20, and the peripheral device receives power from the USB power terminal 30.

A node between the transistor T7 and the USB interface 20 is grounded through the indication unit 11 having a light emitting diode D3 and a resistor R14, and thus when the USB interface 20 is connected to the standby power terminal 90, the indication unit 11 will notify the user that the USB interface 20 is ready to supply power to any connected peripheral device.

Therefore, the USB charging circuit 200 can switch the power supply for the peripheral device from the USB power terminal 30 to the standby power terminal 90 when the computer is in the hibernation state or the OFF state.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. A Universal Serial Bus (USB) charging circuit for a computer, comprising:
   a USB interface;
   a USB power terminal connected with the USB interface to supply power to the USB interface when the computer is in an ON state or a sleep state;
   a standby power terminal connected with the USB interface to supply power to the USB interface when the computer is in a hibernation state or in an OFF state;
   a switch unit for generating a first switch signal to connect the standby power terminal to the USB interface, and generating a second switch signal to disconnect the standby power terminal from the USB interface;
   an Integrated Circuit (IC) chip for outputting a first control signal when the computer is in the sleep state, and outputting a second control signal when the computer is in the hibernation state or in the OFF state; and
   a control unit connected with the USB power terminal, the standby power terminal, the switch unit, the USB interface, and the IC chip, wherein the control unit disconnects the USB interface from the standby power terminal when receiving a high voltage level from a system power terminal or the first control signal from the IC chip; the control unit connects the standby power terminal to the USB interface when receiving the second control signal from the IC chip and the first switch signal from the switch unit; the control unit disconnects the standby power terminal supply from the USB interface when receiving the second control signal from the IC chip and the second switch signal from the switch unit.

2. The USB charging circuit as claimed in claim 1, wherein the control unit comprises a flip-flop chip comprising a clear input, a clock pulse input, and a first signal output; the clear input is connected with the system power terminal, and the IC chip; the clock pulse input is connected with the switch unit; the first signal output is connected with the USB interface, the standby power terminal, and the USB power terminal.

3. The USB charging circuit as claimed in claim 2, wherein the first signal output is connected to a first switch connected between the standby power terminal and the USB interface to control the connection and disconnection between the standby power terminal and the USB interface.

4. The USB charging circuit as claimed in claim 3, wherein the control unit further comprises a second switch, the second switch comprises:
  a first terminal connected to the first signal output of the flip-flop chip through a first resistor, and grounded though a first capacitor;
  a second terminal connected to the first terminal of the first switch through a second resistor, and connected to the standby power terminal through the second resistor and a third resistor in that order; and
  a third terminal grounded;
  wherein a second terminal of the first terminal is connected to the standby power terminal, a third terminal of the first switch is connected to the USB power terminal and the USB interface;
  wherein the first signal output of the flip-flop chip outputs a first signal, when the control unit receives the high voltage level from the system power terminal, or the clear input of the flip-flop chip receives the first control signal from the IC chip, or the clear input of the flip-flop chip receives the second control signal from the IC chip and the clock pulse input of the flip-flop chip receives the second switch signal from the switch unit;
  wherein the first signal output of the flip-flop chip outputs a second signal, when the clear input of the flip-flop chip receives the second control signal from the IC chip and the clock pulse input of the flip-flop chip receives the first switch signal from the switch unit;
  wherein the second switch is turned off, the first switch is turned off, and the standby power terminal is disconnected from the USB interface, when the first terminal of the second switch receives the first signal from the first signal output of the flip-flop chip; and
  wherein the second switch is turned on, the first switch is turned on, and the standby power terminal is connected to the USB interface, when the first terminal of the second switch receives the second signal from the first signal output of the flip-flop chip.

5. The USB charging circuit as claimed in claim 4, wherein the first signal is a low voltage level signal, the second signal is a high voltage level signal, the first switch is a p-channel metal-oxide semiconductor field-effect transistor (PMOSFET), the first terminal, the second terminal, and the third terminal of the first switch are respectively a gate, a drain, and a source of the PMOSFET, and the second switch is an npn bipolar junction transistor (NPN BJT), the first terminal, the second terminal, and the third terminal of the second switch are respectively a base, a collector, and a emitter of the NPN BJT.

6. The USB charging circuit as claimed in claim 4, wherein the flip-flop chip further comprises a second signal output and a data input, and the control unit further comprises:
  a third switch comprising a first terminal connected to the second signal output of the flip-flop chip through a fourth resistor and grounded through a second capacitor, a second terminal connected to the standby power terminal through a fifth resistor, and a third terminal grounded; and
  a fourth switch comprising a first terminal connected to the second terminal of the third switch, a second terminal connected to the standby power terminal through a sixth resistor and connected to the data input of the flip-flop chip, and a third terminal grounded;
  wherein the second signal output of the flip-flop chip outputs a third signal to the first terminal of the third switch, the third switch is turned on, the fourth switch is turned off, the data input of the flip-flop chip receives a fourth signal from the second terminal of the fourth switch, and the first signal output of the flip-flop chip outputs the second signal, when the clear input of the flip-flop chip receives the second control signal from the IC chip and the clock pulse input of the flip-flop chip receives the first switch signal from the switch unit; and
  wherein the second signal output of the flip-flop chip outputs a fifth signal to the first terminal of the third switch, the third switch is turned off, the fourth switch is turned on, the data input of the flip-flop chip receives a sixth signal from the second terminal of the fourth switch, and the first signal output of the flip-flop chip outputs the second signal, when the clear input of the flip-flop chip receives the second control signal from the IC chip and the clock pulse input of the flip-flop chip receives the second switch signal from the switch unit.

7. The USB charging circuit as claimed in claim 6, wherein each of the third signal and the fourth signal is a high voltage level signal, each of the fifth signal and the sixth signal is a low voltage level signal, the third switch is an N-channel metal-oxide semiconductor field-effect transistor (NMOSFET), the first terminal, the second terminal, and the third terminal of the third switch are respectively a gate, a drain, and a source of the NMOSFET, and the fourth switch is an NPN BJT, the first terminal, the second terminal, and the third terminal of the fourth switch are respectively a base, a collector, and a emitter of the NPN BJT.

8. The USB charging circuit as claimed in claim 2, wherein the control unit further comprises a fifth switch comprising a first terminal connected to the system power terminal through a seventh resistor and grounded through a third capacitor, a second terminal connected to the clear input of the flip-flop chip, and a third terminal grounded; when the first terminal of the fifth switch receives the high voltage level from the system power terminal, the fifth switch is turned on, the clear input of the flip-flop chip receives a low voltage level signal.

9. The USB charging circuit as claimed in claim 2, wherein the control unit further comprises:
  a sixth switch comprising a first terminal connected to the standby power terminal through a eighth resistor and grounded through a fourth capacitor, a second terminal connected to the standby power terminal through a ninth resistor, and a third terminal grounded;
  a seventh switch comprising a first terminal connected to the second terminal of the sixth switch, a second terminal connected to the clear input of the flip-flop chip and connected to the standby power terminal through a tenth resistor, and a third terminal grounded;
  wherein the computer is connected to the household power supply, the fourth capacitor is charged by the standby power terminal, the sixth switch is turned off, the seventh switch is turned on, the clear input of the flip-flop chip receives a low voltage level signal from the seventh switch.

10. The USB charging circuit as claimed in claim 9, wherein the sixth switch is an NMOSFET, the first terminal, the second terminal, and the third terminal of the sixth switch are respectively a gate, a drain, and a source of the NMOS- FET, and the seventh switch is an NPN BJT, the first terminal, the second terminal, and the third terminal of the seventh switch are respectively a base, a collector, and a emitter of the NPN BJT.

11. The USB charging circuit as claimed in claim 1, wherein the control unit is connected to a power button which brings the computer into the ON state and generates a third signal to the control unit when depressed; the control unit disconnects the standby power terminal from the USB interface in response to receiving the third control signal.

12. The USB charging circuit as claimed in claim 11, wherein the third control signal is a low voltage level signal.

13. The USB charging circuit as claimed in claim 1, further comprising an indication unit, wherein the control unit is connected to the indication unit for notifying a user when the USB interface is connected to the standby power terminal.

14. The USB charging circuit as claimed in claim 13, wherein the indication unit comprises a light-emitting diode (LED), the LED is connected to the standby power terminal when the USB interface is connected to the standby power terminal.

15. The USB charging circuit as claimed in claim 1, wherein the switch unit comprises a switch button and a Schmitt trigger; the control unit is connected with the standby power terminal through the Schmitt trigger and the switch button; the switch button can be depressed to generate the first switch signal and the second switch signal.

\* \* \* \* \*